Figure 5:
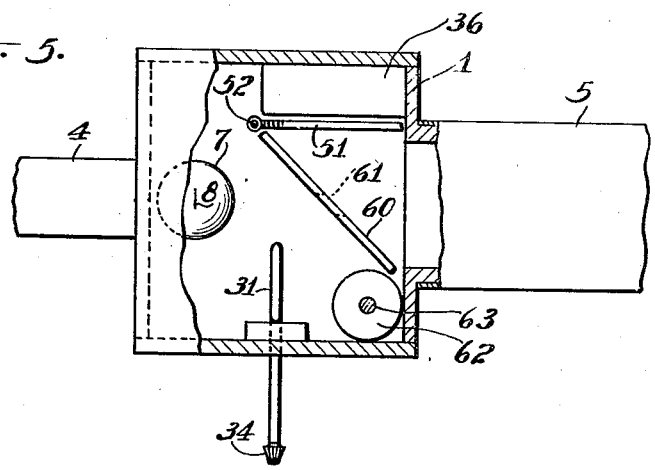

Feb. 4, 1941.　　　E. I. SHOBERT, 2D　　　2,230,438
PYROMETER APPARATUS
Filed Nov. 30, 1938　　　2 Sheets-Sheet 1
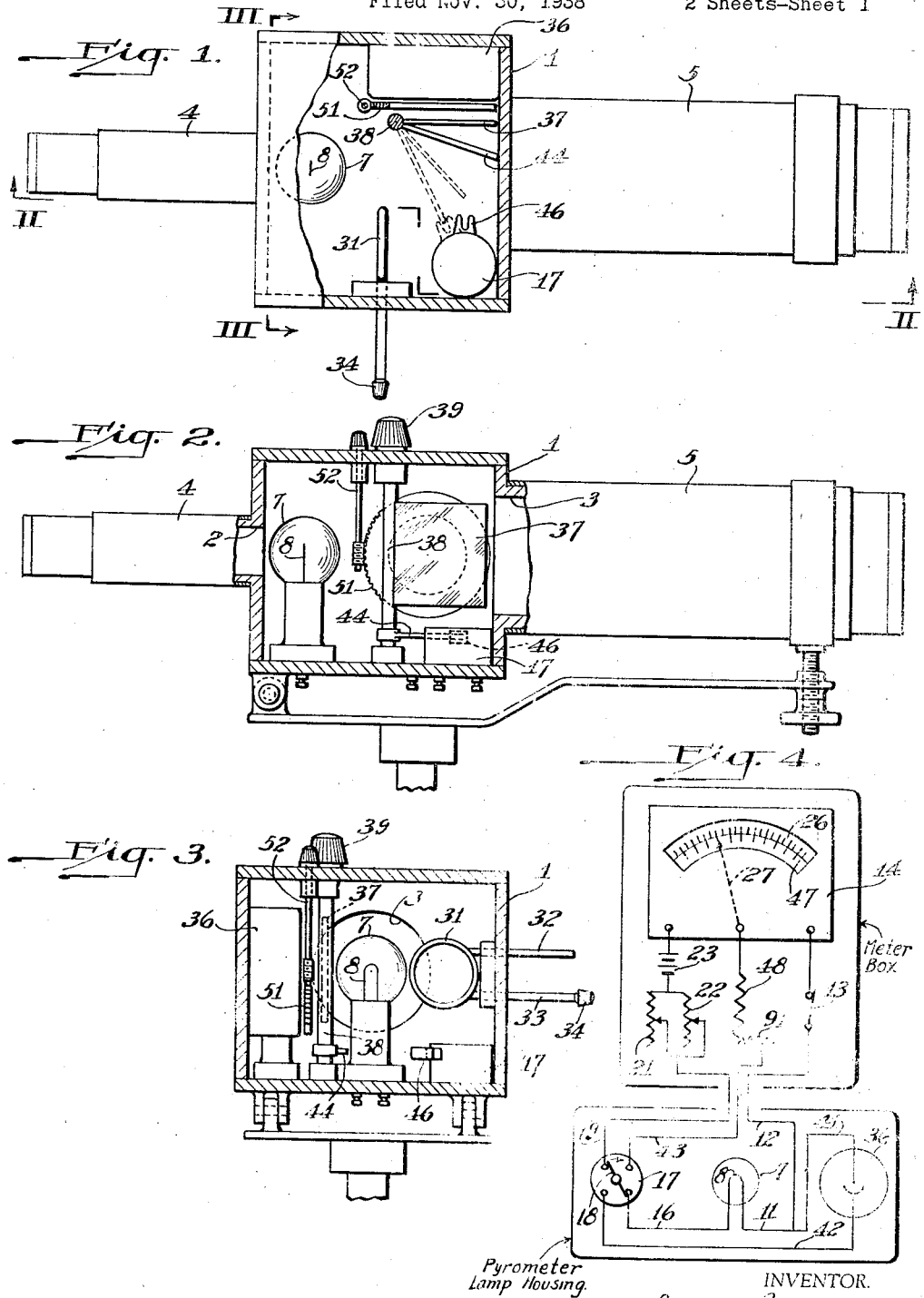
INVENTOR.
Erle I. Shobert II
BY Brown, Critchlow & Flick
his ATTORNEYS.

Feb. 4, 1941.　　　　E. I. SHOBERT, 2D　　　　2,230,438
PYROMETER APPARATUS
Filed Nov. 30, 1938　　　　2 Sheets-Sheet 2

INVENTOR.
Erle I. Shobert II
BY Brown, Critchlow & Flick
his ATTORNEYS.

Patented Feb. 4, 1941

2,230,438

UNITED STATES PATENT OFFICE 2,230,438

PYROMETER APPARATUS

Erle I. Shobert, II, St. Marys, Pa., assignor to Stackpole Carbon Company, St. Marys, Pa., a corporation of Pennsylvania Application November 30, 1938, Serial No. 243,172

13 Claims. (Cl. 88—22.5)

This invention relates to pyrometers.

Optical pyrometers, which can be used when it is possible to measure temperatures by means of visible radiation, are probably the most accurate temperature-measuring devices there are for their range. However, as it is necessary to look through an optical pyrometer every time a temperature reading is desired, it has heretofore been impossible to use an optical pyrometer for continuously indicating, recording or controlling temperatures. On the other hand, radiation pyrometers can be used for all of these purposes, but they have such disadvantages as inaccuracy and difficulty of adjustment. Furthermore, the temperature reading scale used with a radiation pyrometer utilizing a photoelectric cell is highly non-linear, thereby limiting the usefulness of the instrument in certain temperature ranges, and over a period of time the temperature indication tends to drift away from what it should be.

It is among the objects of this invention to provide pyrometer apparatus which has the accuracy and ease of adjustment of an optical pyrometer, which is capable of continuously indicating, recording or controlling temperatures, which is easy to operate, which is stable, which uses substantially linear scales and which is simple and compact in construction.

In accordance with this invention an optical pyrometer of the disappearing-filament type is provided interiorly with means adapted to intercept rays radiating from a hot body to thereby control an electric current so as to give a continuous reading of the temperature of the hot body. This means may be permanently located in the path of the rays, with provision made for sighting past it in order to view the filament against the hot body, or this means may be movable into and out of the path of the rays. In either case, the means preferably comprises a photoelectric cell. In taking a reading with this pyrometer the hot body is first viewed through the pyrometer and the brightness of the filament of the lamp adjusted until the filament disappears. The reading of the meter scale connected in the lamp circuit is noted, and then the reading of the meter scale connected with the photoelectric cell is noted. If the latter reading does not correspond with the immediately preceding reading of the other scale it is adjusted to make it agree. The second reading is then correct, and from then on the scale connected with the cell gives a continuous indication of the temperature of the hot body. To make the cell scale linear and to assure a stable indication, a resistance element is connected in series with the cell.

Figure 6:
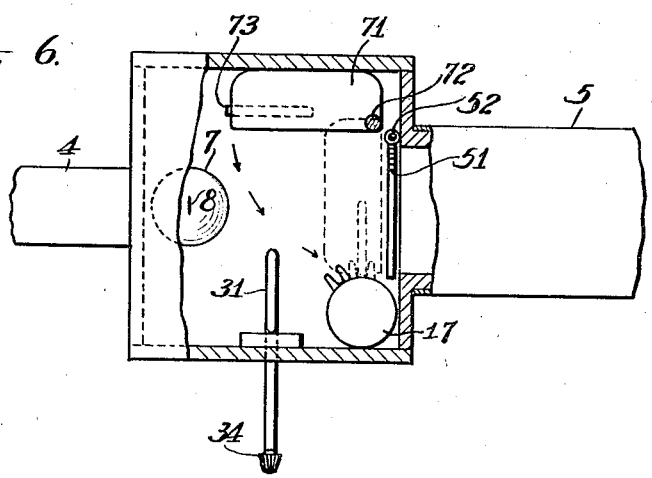
Figure 7:
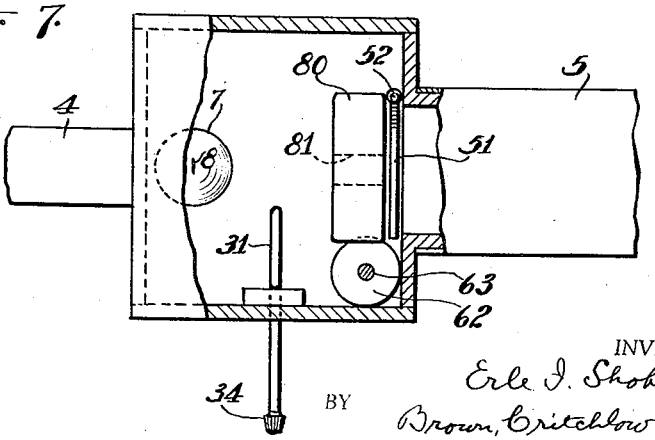

The invention is illustrated in the accompanying drawings in which Fig. 1 is a plan view of my pyrometer with the cover of the lamp housing broken away; Fig. 2 is a side view of the pyrometer with the lamp housing shown in section taken on the line II—II of Fig. 1; Fig. 3 is a vertical section through the lamp housing taken on the line III—III of Fig. 1; Fig. 4 is a diagrammatic view showing the electric circuits by which the filament lamp and the photoelectric cell are connected to the meter; and Figs. 5, 6 and 7 are views, similar to Fig. 1, of three modifications of this invention.

Referring to Figs. 1 to 3 of the drawings, two opposite side walls of a lamp housing 1 are provided with axially aligned openings 2 and 3 from the first of which an adjustable ocular tube 4 projects and from the other of which an adjustable objective tube 5 extends. These tubes are provided with the usual lenses (not shown) whereby they form a telescope through which a body giving off visible light rays may be viewed.

Mounted in the housing directly in front of the ocular tube opening is an incandescent lamp 7 having a filament 8 in the line of vision through the pyrometer. As shown in Fig. 4, one terminal of this lamp is adapted to be connected by wires 11 and 12 and switch 13 with a meter 14 of the type generally used with pyrometers. To complete the circuit, the other terminal of the lamp is connected by a wire 16 to a snap switch 17 having a bridging member 18 by which wire 16 is connected to a wire 17 that leads to rheostats 21 and 22. These rheostats are connected to one terminal of a battery 23 the opposite terminal of which is connected to meter 14. By adjusting the rheostats 21 and 22 the brightness of the lamp filament can be varied until it is the same as that of the hot body seen through the pyrometer, whereupon the filament disappears from view. Two rheostats are used in order to obtain a sufficiently fine adjustment of the current. Meter 14 is provided with a scale 26 and a pointer 27 that indicate the temperature of the hot body in accordance with the amount of current flowing through the meter and lamp circuit.

To prevent the filament from being burned out in attempting to make it disappear against an exceptionally hot body, an absorption screen 31 is mounted on the inner ends of a pair of rods 32 and 33 slidably mounted in the side wall of the lamp housing, as shown in Figs. 1 and 3. One of these rods is provided with a knob 34 by which the screen is moved inwardly between the lamp filament and objective tube 5 so as to decrease the intensity of the light rays coming from the hot body and against which the filament is matched.

A feature of this invention is that my pyrometer apparatus is adapted to give a continuous temperature reading when desired, or to record or control temperatures. Accordingly, a photoelectric cell 36 is mounted in lamp housing 1 at one side of the line of vision therethrough and near the objective tube opening. To make it possible for the heat and light rays radiating from the hot body to strike this cell when desired, a mirror 37 is mounted on a vertical shaft 38 journaled in the top and bottom of the housing. This shaft is likewise disposed at one side of the line of vision through the housing, and is adapted to be turned by a knob 39 on its upper end so as to swing the mirror diagonally across the line of vision, as shown in dotted lines in Fig. 1. When in this position the rays radiating from the hot body and through the objective tube are intercepted by the mirror and deflected laterally against the photoelectric cell. As shown in Fig. 4, the cell is adapted to be connected by a wire 41 to wire 12 which leads to meter 14, and by a wire 42 to snap switch 17 in which bridging member 18 is adapted to connect it through a wire 43 to the meter.

It will be clear that the snap switch is used to switch the meter from the lamp circuit to the cell circuit when it is desired to change from an optical to a radiation reading. In order that this switching will occur automatically when the mirror is swung into or out of operative position, the lower end of mirror shaft 38 is preferably provided with a laterally projecting rigid arm 44 having a downturned outer end. This downturned end is adapted to engage the trigger 46 of snap switch 17 when the mirror is swung out of inoperative position (Fig. 1) in order to switch bridging member 18 from wires 16 and 19 to wires 42 and 43, i. e., from the lamp to the cell circuit. This arm, in connection with the trigger, may also serve as a stop for limiting the movement of the mirror away from the cell, its movement toward the cell being limited by engagement of the arm with the front wall of housing 1. Of course, any other suitable means may be used for limiting these movements of the mirror or for locking it in its two extreme positions.

When the cell circuit is being used, meter 14 indicates the temperature of the hot body on a scale 47 directly adjoining scale 26. In accordance with this invention, it is possible to use a substantially linear scale 47 with the photoelectric cell, by connecting a resistance element 48 in series between the meter and cell. This element may be conveniently located in the meter box in wire 43. This resistance also stabilizes the cell scale temperature indications by preventing pointer 27 from drifting.

For a purpose about to be described, the amount of current flowing in the meter and cell circuit can also be controlled manually. Preferably, this is done by controlling the amount of rays that can strike the photoelectric cell, such as by an iris 51 or the like mounted in front of the cell and manually controlled by turning a shaft 52 connected to it and projected upwardly through the top of the housing.

In using this pyrometer apparatus the pyrometer is first focused on the hot body, the temperature of which it is wished to know, knob 39 having previously been turned to swing mirror 37 out of the line of vision as shown in Fig. 1. This movement of shaft 38 causes arm 44 to actuate trigger 46 and thereby close the circuit between the lamp and meter (Fig. 4). Rheostats 21 and 22 are then manipulated to adjust the brightness of the lamp filament to the point where it disappears from view against the background which is the hot body. The current flowing through the lamp circuit causes pointer 27 to move along scale 26 to indicate the temperature of the hot body.

Knob 39 is then turned to swing mirror 37 across the line of vision through the pyrometer in order to deflect the rays radiating from the hot body against the photoelectric cell 36. This movement of the mirror causes arm 44 to operate snap switch 17 which thereupon opens the lamp circuit and closes the cell circuit. The rays striking the cell determine the amount of current that flows through the cell circuit and thereby determine the position of pointer 27 on scale 47. A reading of this scale is then taken, and if the temperature reading is not the same as the temperature reading taken a moment before from scale 26, iris 51 is adjusted to increase or decrease the amount of rays striking the photoelectric cell so that the current flowing through the cell circuit will swing pointer 27 to a point on scale 47 giving the same temperature reading as the reading taken from scale 26. When the radiation or cell reading has thus been corrected or standardized, the apparatus may be left to continuously indicate the temperature of the hot body. If desired, a recording meter can be used, or temperature-controlling apparatus can be connected with the pyrometer apparatus in any well-known manner.

Pyrometer apparatus constructed in accordance with my invention has the advantages of optical pyrometer accuracy and radiation pyrometer continuous indication, recording or controlling. The apparatus is simple and compact and can be quickly and easily operated. As the pyrometer is focused on exactly the same portion of the hot body for both the optical and radiation temperature readings, there can be no variation in these readings due to viewing different portions of the hot body.

In the modification of this invention shown in Fig. 5 the mirror 60 is permanently mounted in fixed position in operative position, i. e., diagonally across the line of sight through the pyrometer. In order to permit the pyrometer to be used as an optical pyrometer, the center of the mirror is provided with an opening 61 coaxial with the axes of the ocular and objective tubes and just large enough to permit the hot body to be viewed through it as a background for lamp filament 8. In using this pyrometer a reading is first taken after the lamp filament has been made to disappear in the usual way, and then switch 62 is operated to open the circuit between the lamp and its meter scale and to close the circuit between photoelectric cell 36 and its meter scale. As the rays from the hot body strike the cell at all times, it is not necessary to move anything to bring the cell into the path of the rays. This being the case, switch 62 is operated by its own control shaft 63. If desired, this switch may be located in the meter box instead of in the pyrometer housing.

The embodiment of the invention illustrated in Fig. 6 requires no mirror, the photoelectric cell 71 being brought into the path of the rays from the hot body by its own bodily movement. That is, after a reading has been taking on the meter scale connected with lamp 7, cell 71, which is mounted on a vertical shaft 72 journaled in the lamp housing, is swung by this shaft from its inoperative position at one side of the lamp housing to the dotted line position across the inner end of the objective tube. The free end of the cell is preferably provided with a projecting finger 73 which actuates switch 17 as it is moved into operative position and thereby disconnects the lamp from the meter and connects the cell with the meter. As the cell is movable, adjustable iris 51 is preferably mounted across the inner end of the objective tube for standardizing the cell reading with the lamp reading.

The modification of Fig. 7 is similar to Fig. 5 in that the rays continually strike photoelectric cell 80, but like Fig. 6 this embodiment uses no mirror. As here disclosed, the cell is mounted in fixed position across the inner end of objective tube 5 where it is permanently in the path of the rays radiating from the hot body. To permit the disappearing filament lamp reading to be taken, the cell is so constructed that it has a small opening 81 through its center through which the hot body can be viewed behind the lamp filament 8. As in Fig. 5, switch 62 is operated by its own shaft 63 and may be located either in the lamp housing or in the meter box.

In any of these embodiments of the invention the function of iris 51 can be performed by a variable resistance 91 placed in the photoelectric cell circuit, as shown in Fig. 4.

According to the provisions of the patent statutes I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. Pyrometer apparatus comprising a housing, an optical pyrometer filament lamp mounted therein, radiation-sensitive circuit-controlling means mounted in said housing, means associated with the housing for directing rays from a hot body against said lamp and circuit-controlling means and including a common opening in the housing for admission of said rays, said housing being provided with an opening through which said lamp can be seen against said hot body as a background when said rays are directed against the lamp, temperature indicating means, electric circuit means connecting said lamp and circuit-controlling means to said indicating means, means for selectively rendering operable said lamp and circuit-controlling means, and means for varying the current in said electric circuit means when said lamp is operable and is viewed against said hot body background whereby to cause the lamp filament to disappear from view so that the temperature indicating means will indicate the temperature of the hot body.

2. Pyrometer apparatus comprising a housing, an optical pyrometer filament lamp mounted therein, radiation-sensitive circuit-controlling means mounted in said housing, means associated with the housing for directing rays from a hot body against said lamp and circuit-controlling means and including a common opening in the housing for admission of said rays, said housing being provided with an opening through which said lamp can be seen against said hot body as a background when said rays are directed against the lamp, common temperature indicating means, electric circuit means connecting said lamp and circuit-controlling means to said indicating means, means for selectively rendering operable said lamp and circuit-controlling means, means for varying the current in said electric circuit means when said lamp is operable and is viewed against said hot body background whereby to cause the lamp filament to disappear from view so that said temperature indicating means will indicate the temperature of the hot body, and manually operable means for varying the current in said electric circuit means when said circuit-controlling means is operable and said rays are directed thereagainst to thereby give a temperature reading on said indicating means which is calibrated with said first-mentioned temperature indication.

3. Pyrometer apparatus comprising a housing, an optical pyrometer filament lamp mounted therein, radiation-sensitive circuit-controlling means mounted in said housing, means associated with the housing for directing rays from a hot body against said lamp and circuit-controlling means and including a common opening in the housing for admission of said rays, said housing being provided with an opening through which said lamp can be seen against said hot body as a background when said rays are directed against the lamp, common temperature indicating means, a variable electric circuit connecting said lamp with said indicating means, means for varying the current in said circuit whereby a temperature reading may be taken optically with the pyrometer, means for electrically connecting said circuit-controlling means with said indicating means to give a continuous temperature reading, and means for correcting said continuous reading to calibrate it with said optical reading.

4. Pyrometer apparatus comprising a support, an optical pyrometer filament lamp mounted thereon, an electric circuit connected to the lamp filament, means for varying the current in said circuit to cause said filament to disappear from view when viewed against a hot body background, a temperature indicator connected to said circuit for indicating the temperature of the hot body when said filament disappears, radiation-sensitive circuit-controlling means mounted on said support, means for directing rays from said hot body against said circuit-controlling means, means electrically connecting said circuit-controlling means to said temperature indicator to give a continuous temperature reading, means for selectively rendering operable said lamp and circuit-controlling means, and means for varying the current in the circuit connecting said circuit-controlling means and temperature indicator whereby to calibrate said continuous reading with said first-mentioned temperature indication.

5. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, means for connecting the lamp in an electric circuit, means mounted in said housing at one side of said line of vision and adapted to be moved into said line of vision for deflecting laterally the rays radiating from said hot body through said objective opening, radiation-sensitive means mounted in said housing in the path of said deflected rays and responsive thereto for controlling an electric circuit, and means for electrically connecting said radiation-sensitive means to temperature indicating means.

6. Pyrometer apparatus comprising a housing provided in two side walls with optically aligned openings, an objective tube projecting outwardly from one of said openings and adapted to be directed toward a hot body, an optical pyrometer filament lamp mounted in the housing with its filament in the line of vision through said openings, current-varying means for varying the brightness of the filament to cause it to disappear from view against the hot body viewed through said openings, means for connecting said current-varying means to temperature indicating means whereby the temperature of said body can be determined, means mounted in said housing at one side of said line of vision and adapted to be moved into said line of vision for deflecting laterally the rays radiating from said hot body through said objective tube, radiation-sensitive circuit-controlling means mounted in said housing in the path of said deflected rays and responsive thereto, an electric circuit for connecting said circuit-controlling means to continuous temperature indicating means for continuously indicating the temperature of said hot body, and means for adjusting said last-mentioned circuit to calibrate said continuous temperature indication with said first-mentioned temperature determination.

7. Pyrometer apparatus comprising a housing provided in two side walls with optically aligned openings, an ocular tube projecting outwardly from one of said openings, an objective tube projecting outwardly from the other of said openings and adapted to be directed toward a hot body, an optical pyrometer filament lamp mounted in the housing with its filament in the line of vision through said tubes, means for connecting the lamp in an electric circuit, means mounted in said housing at one side of said line of vision and adapted to be moved into said line of vision for deflecting laterally the rays radiating from said hot body through said objective tube, radiation-sensitive means mounted in said housing in the path of said deflected rays and responsive thereto for controlling an electric circuit, means for electrically connecting said radiation-sensitive means to temperature indicating means, and manually operable means for varying the amount of rays striking said radiation-sensitive means.

8. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, an electric circuit connected to said lamp to light its filament, manually operable means for varying the brightness of the filament to cause the filament to disappear from view against the hot body viewed through said openings, means mounted in said housing at one side of said line of vision and adapted to be moved into said line of vision for deflecting laterally the rays radiating from said hot body through said objective opening, radiation-sensitive circuit-controlling means mounted in said housing in the path of said deflected rays and responsive thereto, an electric circuit connected to said radiation-sensitive means and controlled thereby, and means for selectively connecting said circuits with temperature indicating means.

9. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, an electric circuit for connecting said lamp to temperature indicating means, manually operable means for varying the brightness of the filament to cause the filament to disappear from view against the hot body viewed through said openings, means mounted in said housing at one side of said line of vision and adapted to be moved into said line of vision for deflecting laterally the rays radiating from said hot body through said objective opening, radiation-sensitive circuit-controlling means mounted in said housing in the path of said deflected rays and responsive thereto, an electric circuit connected to said radiation-sensitive means and controlled thereby, and an electric switch operable by the movement of said deflecting means when moved into ray-deflecting position for disconnecting said lamp circuit from the temperature indicating means and for connecting said second-mentioned circuit to the temperature indicating means.

10. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, current-varying means for varying the brightness of the filament to cause it to disappear from view against the hot body viewed through said openings, means for connecting said current-varying means to temperature indicating means whereby the temperature of said body can be determined, means mounted in said housing at one side of said line of vision and adapted to be moved into said line of vision for deflecting laterally the rays radiating from said hot body through said objective opening, a photoelectric cell mounted in said housing in the path of said deflected rays and responsive thereto, an electric circuit for connecting said cell to continuous temperature indicating means to continuously indicate the temperature of said hot body, and a manually adjustable iris for controlling the amount of said rays striking said cell whereby to calibrate said continuous temperature indication with said first-mentioned temperature determination.

11. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, means for connecting the lamp in an electric circuit, radiation-sensitive circuit-controlling means mounted in said housing at one side of said line of vision, means for moving said radiation-sensitive means into said line of vision for intercepting rays radiating from said hot body through said objective opening, and means for electrically connecting said radiation-sensitive means to temperature indicating means.

12. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, an electric circuit for connecting said lamp to temperature indicating means, manually operable means for varying the brightness of the filament to cause the filament to disappear from view against the hot body viewed through said openings, radiation-sensitive circuit-controlling means mounted in said housing at one side of said line of vision, means for moving said radiation-sensitive means into said line of vision for intercepting rays radiating from said hot body through said objective opening, an electric circuit connected to said circuit-controlling means and controlled thereby, and an electric switch operable by the movement of said circuit-controlling means when moved into ray-intercepting position for disconnecting said lamp circuit from the temperature indicating means and for connecting said second-mentioned circuit to the temperature indicating means.

13. Pyrometer apparatus comprising a housing provided in two side walls with optically aligned ocular and objective openings, said objective opening being adapted to be directed toward a hot body, an optical pyrometer filament lamp mounted in the housing with its filament in the line of vision through said openings, means for connecting the lamp in an electric circuit, radiation-sensitive circuit-controlling means mounted in said housing between said lamp and objective opening for intercepting some of the rays radiating through said objective opening from said hot body, and means for electrically connecting said radiation-sensitive means to temperature indicating means, said radiation-sensitive means being provided with an opening therethrough in optical alignment with said ocular and objective openings whereby said radiation-sensitive means does not obstruct said line of vision.

ERLE I. SHOBERT, II.